United States Patent

Boehmke

[11] 3,894,064
[45] July 8, 1975

[54] ω-AMINOALKANESULPHONIC ACID DERIVATIVES

[75] Inventor: Gunther Boehmke, Leverkusen, Germany

[73] Assignee: Bayer Aktiengesellschaft, Leverkusen-Bayerwerk, Germany

[22] Filed: June 22, 1973

[21] Appl. No.: 372,607

[30] Foreign Application Priority Data
June 24, 1972 Germany............................ 2231070

[52] U.S. Cl.................................. 260/401; 260/401
[51] Int. Cl.$^2$...................................... C07C 143/90
[58] Field of Search...................... 260/401

[56] References Cited
UNITED STATES PATENTS

| | | | |
|---|---|---|---|
| 2,830,082 | 4/1958 | Sexton et al. | 260/513 |
| 2,880,219 | 3/1959 | Burnette et al. | 260/401 |
| 2,903,466 | 9/1959 | Walling et al. | 260/401 |
| 2,993,918 | 7/1961 | Mannheimer | 260/401 |

*Primary Examiner*—Elbert L. Roberts
*Attorney, Agent, or Firm*—Plumley & Tyner

[57] ABSTRACT

New ω-aminoalkanesulphonic acid derivatives of the formula

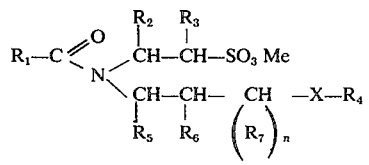

in which
$R_1$ represents an optionally substituted $C_8$–$C_{22}$-alkyl or $C_8$–$C_{22}$-alkenyl radical,
$R_2$ and $R_3$ independently of one another denote hydrogen or $C_1$–$C_2$-alkyl radical and
$R_5$, $R_6$ and $R_7$ independently of one another denote hydrogen or a $C_1$–$C_6$-alkyl radical,
n is 0 or 1,
X represents oxygen or sulphur,
$R_4$ denotes preferably hydrogen or $C_1$–$C_6$-alkyl or a cycloalkyl, aralkyl or aryl radical and
Me denotes a cation,
and a process for their manufacture. The compounds are excellent washing agents, dispersing agents, emulsifiers, softeners for textile materials and leather and mould release agents.

6 Claims, No Drawings

W-AMINOALKANESULPHONIC ACID DERIVATIVES

The invention relates to aminoalkanesulphonic acid compounds; more particularly it concerns new ω-aminoalkanesulphonic acid derivatives of the formula

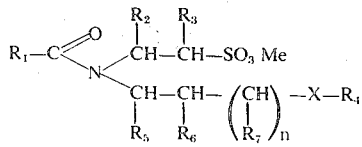

in which
- $R_1$ represents an optionally substituted $C_8$–$C_{22}$-alkyl or $C_8$–$C_{22}$-alkenyl radical,
- $R_2$ and $R_3$ independently of one another denote hydrogen or a $C_1$–$C_2$-alkyl radical and
- $R_5$, $R_6$ and $R_7$ independently of one another denote hydrogen or a $C_1$–$C_6$-alkyl radical,
- $n$ is 0 or 1,
- X represents oxygen or sulphur,
- $R_4$ denotes preferably hydrogen or $C_1$–$C_6$-alkyl or a cycloalkyl, aralkyl or aryl radical and
- Me denotes a cation, a process for their manufacture and their use as washing agents, dispersing agents, emulsifiers, softeners for textile materials and leather, and as mould release agents.

The compounds according to the invention, of the formula I, in which $R_2$ and $R_3$ represent hydrogen and X represents oxygen are particularly preferred; amongst these compounds, those wherein $R_5$, $R_6$ and $R_7$ denote hydrogen have in turn proved particularly valuable.

The manufacturing process according to the invention consists of acylating ω-aminoalkanesulphonic acids of the formula

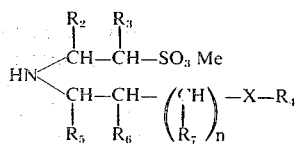

in which
$R_2$, $R_3$, $R_4$, $R_5$, $R_6$, $R_7$, $n$, X and Me have the abovementioned meaning,
with carboxylic acids or carboxylic acid chlorides of the formula $R_1$—COOH   or   $R_1$—COCl        III If carboxylic acid chlorides are used for the acylation of the ω-aminoalkanesulphonic acids, the Schotten-Baumann process is used, that is to say the reaction is carried out in an aqueous medium in the presence of an amount of alkali which suffices to bind the hydrogen chloride produced. Preferably, however, the acylation is carried out with carboxylic acids because in this way salt-free acyl derivatives are obtained, in a substantially more advantageous space-time yield. For the acylation with carboxylic acids, ω-aminoalkanesulphonic acids and carboxylic acids are reacted, advantageously in about equimolar amounts at temperatures of 100°C to 300°C.

The acylation of the ω-aminoalkanesulphonic acids of the formula II with the carboxylic acids of the formula III can be carried out batchwise or continuously. In the acylation below 150°C, the water formed in the reaction is advantageously removed by azeotropic distillation by means of a customary entraining agent such as toluene or xylene. However, the acylation takes place particularly advantageously if ω-aminoalkanesulphonic acids and carboxylic acids are reacted in the melt at 150°C to 250°C, preferably 180°C to 220°C, if appropriate in a protective gas atmosphere (for example under nitrogen or carbon dioxide).

The ω-aminoalkanesulphonic acids to be used in the process according to the invention are soluble, under the reaction conditions, in the carboxylic acids used for the acylation. Hence, a very smooth and complete reaction is achieved; the acylation products are distinguished by high purity.

Possible cations Me are above all alkali metal ions, such as the sodium ion, alkaline earth metal ions, such as the magnesium and calcium ion, and ammonium ions, such as the ammonium or monoethanolammonium, diethanolammonium or triethanolammonium ion.

As examples of representatives of the carboxylic acids of the formula III to be used in the process according to the invention there may be mentioned: capric acid, caprylic acid, undecylic acid, lauric acid, myristic acid, stearic acid, arachidic acid, behenic acid, oleic acid, ricinoleic acid, hydroxystearic acid, dihydroxystearic acid, phenylstearic acid and erucic acid; acid mixtures as obtained from natural fats by saponification, for example from coconut fat, palm oil, palm kernel fat, groundnut oil, soya oil, thistle oil, cottonseed oil, rape oil, sunflower oil, lard or tallow.

The compounds of the formula II in which $R_2$, $R_3$, $R_4$, $R_5$, $R_6$, $R_7$, X and n have the meaning indicated in Table 1 below may be mentioned as representatives of the ω-aminoalkanesulphonic acids to be used in the process according to the invention:

Table 1

| $R_2$ | $R_3$ | $R_4$ | $R_5$ | $R_6$ | $R_7$ | n | X | Me+ |
|---|---|---|---|---|---|---|---|---|
| H | H | H | H | H | — | 0 | O | Na+ |
| H | H | H | H | $CH_3$ | — | 0 | O | Ca+ |
| H | H | H | H | $C_2H_5$ | — | 0 | O | Na+ |
| H | H | H | H | n—$C_3H_7$ | — | 0 | O | Na+ |
| H | H | H | $CH_3$ | H | H | 1 | O | Na+ |
| H | H | $CH_3$ | H | H | — | 0 | O | Na+ |
| H | H | $CH_3$ | H | H | H | 1 | O | Na+ |
| H | H | $C_2H_5$ | H | H | H | 1 | O | Na+ |
| H | H | n—$C_3H_7$ | H | H | H | 1 | O | Na+ |
| H | H | n—$C_4H_9$ | H | H | H | 1 | O | Na+ |
| H | H | n—$C_6H_{13}$ | H | H | H | 1 | O | K+ |
| H | H | Phenyl | H | H | — | 0 | O | K+ |
| H | H | $C_2H_5$ | H | H | — | 0 | S | $NH_2(C_2H_4OH)_2$ |
| H | H | i—$C_4H_9$ | H | H | — | 0 | S | Na+ |
| H | H | n—$C_6H_{13}$ | H | H | — | 0 | S | Na+ |

Table 1—Continued

| R₂ | R₃ | R₄ | R₅ | R₆ | R₇ | n | X | Me⁺ |
|---|---|---|---|---|---|---|---|---|
| CH₃ | H | CH₃ | H | H | — | 0 | O | Na⁺ |
| C₂H₅ | H | CH₃ | H | H | H | 1 | O | NH₄⁺ |
| H | CH₃ | CH₃ | H | H | — | 0 | O | Na⁺ |
| H | C₂H₅ | n—C₃H₇ | H | H | H | 1 | O | Na⁺ |
| H | H | C₆H₁₁ | H | H | H | 1 | O | Na⁺ |
| H | H | Benzyl | H | H | H | 1 | O | Na⁺ |

The manufacture of the ω-aminoalkanesulphonic acids to be employed as starting compounds in the process according to the invention is advantageously carried out by reacting the ω-hydroxyalkanesulphonic acids or their alkali salts, for example the sodium salt of β-hydroxyethanesulphonic acid, with the appropriate alkanolamines, alkoxyalkylamines, aryloxyalkylamines or alkylmercaptoalkylamines for example ethanolamine, 1-aminopropanol-(2), 1-amino-butanol-(2), 3-butoxy-propylamine, 3-Cyclohexoxy-propylamine and 3-benzyloxypropylamine, at temperatures of 180°C to 220°C. The reaction takes place to a degree of conversion of over 75% even under normal pressure at 180°C to 190°C, and can be completed to a degree of conversion of 85 to 95% of theory at 210°C in an autoclave.

The crude products obtained in this way can be employed, without further purification, for the manufacture of the compounds of the formula I according to the invention.

The ω-aminoalkanesulphonic acid derivatives according to the invention, of the formula I, are excellent washing agents, especially for wool and leather, and also effective emulsifiers. Their surface activity is greater than that of the known N-acyl-n-methyltaurides. The activity of the compounds according to the invention as dispersing agents corresponds to the activity of the known dispersing agents based on formaldehyde-arylsulphonic acid condensation products but they offer the advantage over the latter of being biologically degradable. They furthermore have an excellent capacity for keeping suspensions of solids in water, for example pigment preparations, in a mobile consistency and repressing thixotropy. The ω-aminoalkanesulphonic acid derivatives of the formula I, according to the invention, show excellent softener properties for textiles and leather if $R_1$ represents a $C_{18}$–$C_{22}$-alkyl or $C_{18}$–$C_{22}$-alkenyl radical.

Furthermore, the compounds according to the invention of the formula I which are distinguished by high temperature resistance are suitable for use as mould release agents in the manufacture of rubber and plastics articles by the compression moulding or injection moulding process.

EXAMPLE 1

280 g of stearic acid are added at 120°C to a melt of 210 g of technical N-hydroxyethyltauride; the liquid reaction mixture is rapidly heated to 160°C, whilst stirring, and is further heated to 180°C. At this temperature, the water of reaction is distilled off whilst passing a slight stream of nitrogen over the mixture (duration, about 5 hours). The N-stearoyl-N-hydroxyethyl-tauride is obtained in the form of a slightly yellowish wax. The acid number of the product is 5 to 7.

The solidified melt can be converted into flakes by means of a suitable device (cooled roller) or can be stirired with an equal amount of water to give a stiff, easily water-soluble, paste.

The N-stearoyl-N-hydroxyethyl-tauride obtained has excellent properties as a washing agent. When used for washing cotton, a pleasant soft handle of the fabric is simultaneously achieved thereby. The compound is particularly suitable for the washing and after-treatment of leather since the leather retains its full pleasantly soft handle.

The N-hydroxyethyltauride used as the starting compound was manufactured as follows:

148 g of hydroxyethanesulphonic acid (sodium salt) and 61 g of monoethanolamine were heated for 5 hours to 210°C in an autoclave. After cooling the reaction mixture to between 150°C and 160°C, 18 g of water and 3 to 5 g of monoethanolamine were distilled off in vacuo. The residual N-hydroxyethyltauride was about 92 – 94% pure.

EXAMPLE 2

270 g of oleic acid (acid number: 207; iodine number: 80) and 210 g of 92% strength N-hydroxyethyltauride are heated to 180°C whilst stirring. 18 g of water are distilled off over the course of 5 hours at 180° to 190°C whilst passing in a slight stream of nitrogen. The N-oleoyl-N-hydroxyethyltauride is obtained in the form of a yellowish mass of the consistency of petroleum jelly.

The compound is outstandingly suitable for dispersing organic pigments.

The surface tension of the aqueous solution of 1 g of the compound/l is $\sigma = 30.4$ dyn/cm. The surface tension of an aqueous solution of 1 g/l of the known N-oleoyl-N-methyltauride is $\sigma = 33.6$ dyn/cm.

EXAMPLE 3

290 g of technical oleic acid chloride are added dropwise slowly to a 50% strength aqueous solution of 110 g of 92% strength N-hydroxyethyltauride at 25° to 30°C whilst stirring well. After about 100 g of oleic acid chloride have been added, 89 g of 45% strength sodium hydroxide solution are added dropwise simultaneously at a speed such that the pH-value of the reaction mixture is 8 to 9. After completion of the reaction, the reaction product is obtained in the form of a 50% strength white paste. This is outstandingly suitable for use as a washing agent and also as a dispersing agent in dyeing liquors and for dispersing organic pigments.

EXAMPLE 4

240 g of N-(3-methoxypropyl)-tauride, the manufacture of which is described below, and 270 g of technical oleic acid (acid number: 207; iodine number: 90) are heated under a nitrogen atmosphere, whilst stirring, initially for 3 hours to 190° – 195°C and subsequently for 3 to 4 hours to 210° – 220°C. In total, 36 g of water distil off. The N-oleoyl-N-(3-methoxypropyl)-tauride is obtained in the form of a very easily water-soluble light brown mass of the consistency of petroleum jelly.

The compound possesses excellent dispersing agent properties. The surface tension of the aqueous solution of 1 g/l is $\sigma = 29.5$ dyn/cm; that is to say, the product has a high surface activity. It is an effective wetting agent; wetting values (of a 1% strength aqueous solution, determined in accordance with the immersion wetting method at 60°C) for wool: 9.3 seconds; for cotton: 25.8 seconds.

The determination of the foam index (by the Schlachter foam whipping method) gives a value of 1,200 cm$^3$ for a solution of 1.5 g/l at 25°C.

The N-(3-methoxypropyl)-tauride employed as the starting compound was manufactured by reaction of 90 g of methoxypropylamine with 150 g of hydroxyethanesulphonic acid (sodium salt) at 210°C and 6 to 7 atmospheres gauge in an autoclave. The reaction product was colourless, and solid at room temperature, and contained about 7.5% of water.

EXAMPLE 5

250 g of the crude N-(3-methoxypropyl)-tauride described in Example 4 and 270 g of technical stearic acid are reacted for 3 hours at 190°C and subsequently for 4 hours at 200° to 205°C as described in Example 4. After distilling off about 36 g of water and cooling the reaction mixture, N-stearoyl-N-(3-methoxypropyl)-tauride is obtained in the form of a pale yellowish wax.

The compound is easily soluble in water. It is very suitable for use as a dispersing agent in the manufacture of polymer latices. In the rubber industry, it can be employed as an effective and heat-resistant mould release agent in hot vulcanisation.

When using the compound as a washing agent for leather and wool, the compound is distinguished by a very good washing action and also by the fact that it imparts a full soft handle to the washed materials.

EXAMPLE 6

If 220 g of coconut fatty acid and 240 g of crude N-(3-methoxypropyl)-tauride are reacted in the manner described in Example 4, N-coconut fatty acid N-(3-methoxypropyl)-tauride is obtained. The compound results in the form of a slightly yellowish wax.

The compound is very easily soluble in water. It is an excellent washing agent for wool, leather and cotton. It is furthermore suitable for use as a dispersing agent in dyebaths when dyeing polyester fibre textile materials with dispersion dyestuffs.

EXAMPLE 7

270 g of technical oleic acid and 280 g of crude N-(3-butoxypropyl)-tauride (sodium salt) are fused as described in Example 4. A total of 18 g of water are distilled from the melt by heating for 3 hours to 190° – 195°C and subsequently heating for about 4 hours to 215°C. The N-oleoyl-N-(3-butoxypropyl)-tauride obtained in this manner is a light brownish mass of the consistency of petroleum jelly which has an acid number of about 4 and is very easily soluble in water.

The excellent dispersing properties of the compound can be seen from the following dispersing experiments:

1. The addition of 3% of N-oleoyl-N-(3-butoxypropyl)-tauride (relative to zinc oxide) to a 5% strength dispersion of a finely divided zinc oxide gives a finely divided dispersion which is still stable even after standing for 24 hours. Without the addition of the dispersing agent, the zinc oxide flocculates from the dispersion already after 10 minutes.

2. A 50% strength mixture of a finely divided zinc oxide with water is a stiff crumbly mass which cannot be stirred. If 5% of N-oleoyl-N-(3-butoxypropyl)-tauride (relative to zinc oxide) is added thereto, a mobile suspension is obtained, which can be diluted without difficulties to give a stable dispersion.

EXAMPLE 8

270 g of technical oleic acid and 230 g of N-(2-hydroxypropyl)-tauride (approximately 90% strength crude product) are fused whilst stirring, under a nitrogen atmosphere. 18 g of water are distilled from the clear melt by heating to 180°C for 3 hours and subsequently heating to 210°C for 3 hours. After cooling the reaction mixture, N-oleoyl-N-(2-hydroxypropyl)-tauride is obtained in the form of a yellowish mass of the consistency of petroleum jelly.

The compound is suitable for use as a dispersing agent and washing agent.

The N-(2-hydroxypropyl)-tauride employed as the starting compound was manufactured by heating 150 g of hydroxyethanesulphonic acid (sodium salt) and 75 g of 2-hydroxypropylamine-(1) for 7 hours to 205° – 210°C under 5 to 6 atmospheres gauge pressure. After cooling the reaction mixture to 150° – 160°C, 18 g of water were distilled from it.

We claim:

1. New ω-aminoalkanesulphonic acid derivatives of the formula $$R_1-C\begin{matrix}O\\\diagup\\\diagdown\\N\end{matrix}\begin{matrix}R_2&R_3\\|&|\\CH-CH-SO_3\,Me\\|&|\\CH-CH-\left(CH\right)_n-X-R_4\\|&|&|\\R_5&R_6&R_7\end{matrix}$$

in which
- $R_1$ represents an optionally substituted $C_8$–$C_{22}$-alkyl or $C_8$–$C_{22}$-alkenyl radical,
- $R_2$ and $R_3$ independently of one another denote hydrogen or a $C_1$–$C_2$-alkyl radical and
- $R_5$, $R_6$ and $R_7$ independently of one another denote hydrogen or a $C_1$–$C_6$-alkyl radical,
- $n$ is 0 or 1,
- X represents oxygen or sulphur,
- $R_4$ denotes hydrogen, a $C_1$–$C_6$-alkyl, cycloalkyl, aralkyl or an aryl radical and
- Me denotes a cation 2. ω-Aminoalkanesulphonic acid derivatives according to claim 1, wherein $R_2$ and $R_3$ are hydrogen and X is oxygen.

3. ω-Aminoalkanesulphonic acid derivatives according to claim 1, wherein $R_2$, $R_3$, $R_5$, $R_6$ and $R_7$ are hydrogen, $R_4$ is hydrogen or $C_1$–$C_6$-alkyl and X is oxygen.

4. The ω-aminoalkanesulphonic acid of claim 1 in which $R_4$ is hydrogen, $C_1$–$C_6$-alkyl, cyclohexyl, phenyl or benzyl.

5. The ω-aminoalkanesulphonic acid derivative of claim 1 in which
- $R_1$ is $C_8$–$C_{22}$-alkyl; $C_8$–$C_{22}$-alkenyl; or $C_8$–$C_{22}$-alkyl or alkenyl substituted with hydroxyl or phenyl;
- $R_2$ and $R_3$ independently of one another are hydrogen or $C_1$–$C_2$-alkyl;
- $R_5$, $R_6$ and $R_7$ independently of one another are hydrogen or $C_1$–$C_6$-alkyl;
- $n$ is 0 or 1;
- X is oxygen or sulphur;
- Me is a cation; and
- $R_4$ is hydrogen, $C_1$–$C_6$-alkyl, cyclohexyl, phenyl or benzyl.

6. The ω-aminoalkanesulphonic acid derivative of claim 1 in which X is oxygen.

* * * * *